US010802140B2

(12) United States Patent
Aoki et al.

(10) Patent No.: US 10,802,140 B2
(45) Date of Patent: Oct. 13, 2020

(54) RADAR DEVICE AND VEHICLE VELOCITY CORRECTION METHOD

(71) Applicant: DENSO TEN LIMITED, Kobe-shi, Hyogo (JP)

(72) Inventors: Shinya Aoki, Kobe (JP); Yasuhiro Kurono, Kobe (JP); Daisuke Nishio, Kobe (JP)

(73) Assignee: DENSO TEN Limited, Kobe-shi (JP)

( * ) Notice: Subject to any disclaimer, the term of this patent is extended or adjusted under 35 U.S.C. 154(b) by 230 days.

(21) Appl. No.: 15/838,877

(22) Filed: Dec. 12, 2017

(65) Prior Publication Data

US 2018/0203109 A1 Jul. 19, 2018

(30) Foreign Application Priority Data

Jan. 17, 2017 (JP) .................. 2017-006229

(51) Int. Cl.
| | |
|---|---|
| *G01S 13/931* | (2020.01) |
| *G01S 13/36* | (2006.01) |
| *G08G 1/16* | (2006.01) |
| *G01S 7/41* | (2006.01) |
| *B60W 30/09* | (2012.01) |

(Continued)

(52) U.S. Cl.
CPC ........... *G01S 13/931* (2013.01); *B60W 30/09* (2013.01); *G01S 7/354* (2013.01); *G01S 7/415* (2013.01); *G01S 13/345* (2013.01); *G01S 13/36* (2013.01); *G01S 13/726* (2013.01); *G08G 1/16* (2013.01); *G08G 1/165* (2013.01); *G08G 1/166* (2013.01); *G01S 2007/356* (2013.01); *G01S 2013/932* (2020.01); *G01S 2013/9327* (2020.01);

(Continued)

(58) Field of Classification Search
CPC ........... G01S 13/931; G01S 2013/9346; G01S 2013/9353; G01S 2013/9371; G08G 1/16
USPC ................... 342/71, 104, 105, 107, 109, 114
See application file for complete search history.

(56) References Cited

U.S. PATENT DOCUMENTS

| | | | |
|---|---|---|---|
| 6,317,073 B1 * | 11/2001 | Tamatsu | G01S 7/352 342/70 |
| 7,504,986 B2 * | 3/2009 | Brandt | G01S 13/931 342/70 |

(Continued)

FOREIGN PATENT DOCUMENTS

| | | | | |
|---|---|---|---|---|
| JP | 2000-081480 A | | 3/2000 | |
| JP | 2006275748 | * | 3/2005 | ............. G01S 13/93 |

(Continued)

*Primary Examiner* — Erin F Heard
*Assistant Examiner* — Michael W Justice
(74) *Attorney, Agent, or Firm* — Oliff PLC

(57) ABSTRACT

There is provided a radar device. A detection vehicle velocity acquiring unit is configured to acquire a detection vehicle velocity detected on the basis of rotation of a wheel. A relative velocity calculating unit is configured to calculate the relative velocity of a still object. A correction value calculating unit is configured to calculate a first correction value on the basis of the detection vehicle velocity and the relative velocity of the still object obtained in a CW mode and calculate a second correction value on the basis of the detection vehicle velocity and the relative velocity of the still object obtained in a FM-CW mode. A vehicle velocity correcting unit is configured to correct the detection vehicle velocity using at least one of the first correction value and the second correction value.

6 Claims, 13 Drawing Sheets

(51) Int. Cl.
G01S 13/72 (2006.01)
G01S 7/35 (2006.01)
G01S 13/34 (2006.01)

(52) U.S. Cl.
CPC ............... G01S 2013/93185 (2020.01); G01S 2013/93271 (2020.01)

(56) References Cited

U.S. PATENT DOCUMENTS

| | | | | |
|---|---|---|---|---|
| 2008/0291078 | A1* | 11/2008 | Hilsebecher | G01S 13/343 342/70 |
| 2015/0369912 | A1* | 12/2015 | Kishigami | G01S 13/26 342/113 |
| 2017/0082744 | A1* | 3/2017 | Matsumoto | G01S 13/931 |

FOREIGN PATENT DOCUMENTS

| | | | |
|---|---|---|---|
| JP | 2006-275748 | A | 10/2006 |
| JP | 2016-125945 | A | 7/2016 |

* cited by examiner

RADAR DEVICE AND VEHICLE VELOCITY CORRECTION METHOD

CROSS-REFERENCE TO RELATED APPLICATION

This application is based on and claims priority under 35 USC 119 from Japanese Patent Application No. 2017-006229 filed on Jan. 17, 2017.

TECHNICAL FIELD

The present invention relates to a radar device and a vehicle velocity correction method.

RELATED ART

In the related art, for example, a radar device which is mounted on a vehicle, and detects targets existing in the traveling direction of the vehicle by transmitting transmission waves in the traveling direction of the vehicle and receiving the reflected waves from the targets is known (see Patent Document 1 for instance).

Also, the above-mentioned radar device detects, for example, the relative velocity between the vehicle and each target, and the like. If the relative velocity of a target is equal to the velocity of the vehicle detected by a vehicle velocity sensor, the radar device specifies the corresponding target as a still object.

[Patent Document 1] Japanese Patent Application Laid-Open No. 2006-275748

However, since the above-mentioned vehicle velocity sensor detects the velocity of the vehicle on the basis of rotation of a wheel of the vehicle, there is a fear that if the diameter of the wheel of the vehicle changes, for example, due to the air pressure of the wheel and the like, an error relative to the actual velocity of the vehicle may occur in the velocity of the vehicle which is detected (hereinafter, also referred to as a detection vehicle velocity).

In the radar device, if an error occurs in the detection vehicle velocity, for example, the process of determining whether each target is a still object is influenced. For this reason, a technology capable of appropriately correcting a detection vehicle velocity is desired.

SUMMARY

It is therefore an object of the present invention is to provide a radar device and a vehicle velocity correction method capable of appropriately correcting a detection vehicle velocity detected on the basis of rotation of a wheel of a vehicle.

According to an aspect of the embodiments of the present invention, a radar device includes a detection vehicle velocity acquiring unit, a relative velocity calculating unit, a correction value calculating unit, and a vehicle velocity correcting unit. The detection vehicle velocity acquiring unit acquires a detection vehicle velocity detected on the basis of rotation of a wheel. The relative velocity calculating unit calculates the relative velocity of a still object on the basis of the frequencies of the reflected waves of a transmission wave from targets in each of an FM-CW mode for transmitting a transmission wave to targets, which is applied frequency modulation and a CW mode for transmitting a transmission wave to targets, which is not applied frequency modulation. The correction value calculating unit calculates a first correction value on the basis of the detection vehicle velocity and the relative velocity of the still object obtained in the CW mode and calculates a second correction value on the basis of the detection vehicle velocity and the relative velocity of the still object obtained in the FM-CW mode. The vehicle velocity correcting unit corrects the detection vehicle velocity using at least one of the first correction value and the second correction value.

According to the aspect of the embodiments of the present invention, it is possible to appropriately correct a detection vehicle velocity detected on the basis of rotation of the wheel of the vehicle.

BRIEF DESCRIPTION OF THE DRAWINGS

Exemplary embodiments of the present invention will be described in detail based on the following figures, wherein.

DETAILED DESCRIPTION

Hereinafter, embodiments of a radar device and a vehicle velocity correction method will be described in detail with reference to the accompanying drawings. However, the present invention is not limited to the following embodiments.

<1. Overview of Vehicle Velocity Correction Method>

Figure 1:
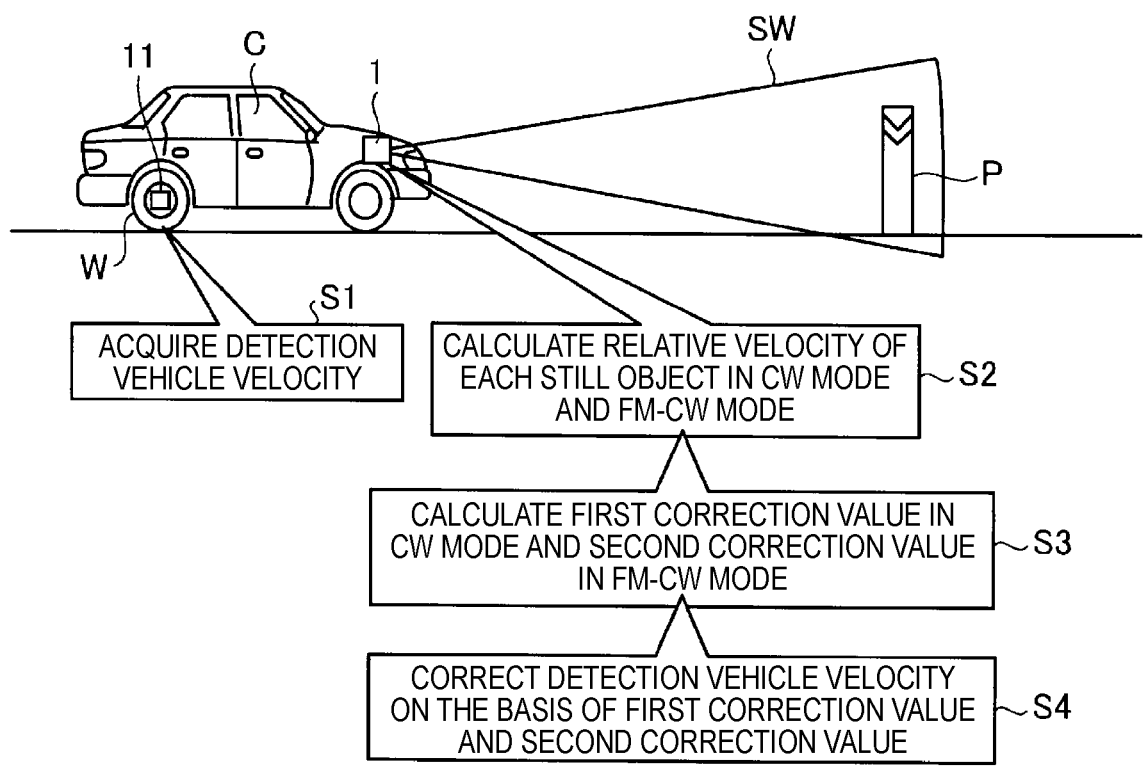
FIG. 1 is an explanatory view of a vehicle velocity correction method according to an embodiment.

Hereinafter, an overview of a vehicle velocity correction method which is performed in a radar device according to an embodiment will be described with reference to FIG. 1. FIG. 1 is an explanatory view of the vehicle velocity correction method according to the embodiment.

As shown in FIG. 1, a radar device 1 is mounted on a vehicle C. The radar device 1 is installed at the center of the front grille of the vehicle C. However, the present invention is not limited thereto, and the radar device may be installed at an arbitrary position of the vehicle C such as the back, the side, or the rearview mirror.

The radar device 1 detects targets existing in the traveling direction of the vehicle C by transmitting transmission waves SW in the traveling direction of the vehicle C and receiving the reflected waves from targets.

Also, on the vehicle C, a vehicle velocity sensor 11 is mounted. The vehicle velocity sensor 11 is connected directly or indirectly to a wheel W, an axle (not shown in the drawings), or the like, and detects a detection vehicle velocity on the basis of rotation of the wheel W. Specifically, the vehicle velocity sensor 11 outputs a pulse signal, for example, whenever the wheel W of the vehicle C rotates by a predetermined angle, and detects a detection vehicle velocity on the basis of the number of pulse signals per unit time, the diameter of the wheel W, and the like.

After detecting targets, the radar device 1 also performs a still-object determining process of determining targets having a relative velocity equal to the detection vehicle velocity of the vehicle velocity sensor 11 as still objects P. Also, in FIG. 1, a pole installed on the road is shown as an example of a still object P.

Since the vehicle velocity sensor 11 detects a detection vehicle velocity on the basis of rotation of the wheel W as described above, if the diameter of the wheel W changes due to the air pressure of the wheel W, the degree of wear of the wheel, wheel replacement, or the like, the detection vehicle velocity may become different from the actual vehicle velocity, resulting in an error in the detection vehicle velocity. If an error occurs in the detection vehicle velocity, for example, the error may influence the still-object determining process of the radar device 1.

For this reason, the radar device 1 according to the present embodiment is configured to be able to appropriately correct a detection vehicle velocity detected on the basis of rotation of the wheel W. Hereinafter, this configuration will be described.

The radar device 1 according to the present embodiment is configured to be able to transmit transmission waves SW in both of a CW (Continuous Wave) mode and an FM-CW (Frequency Modulated Continuous Wave) mode.

The CW mode is a mode for outputting a transmission wave SW to the vicinity of the vehicle C, without performing frequency modulation on the transmission wave. Also, the FM-CW mode is a mode for performing frequency modulation on a transmission wave SW and then outputting the transmission wave to the vicinity of the vehicle C. The radar device 1 can output transmission waves SW to the vicinity of the vehicle C while switching between the CW mode and the FM-CW mode.

Also, in the CW mode, it is possible to detect the relative velocities of targets with respect to the vehicle C on the basis of the frequencies of the reflected waves of a transmission wave from the targets. Also, in the FM-CW mode, it is possible to detect the relative velocities of targets with respect to the vehicle C and the distances of the targets from the vehicle on the basis of the frequencies of reflected waves.

In the present embodiment, the radar device 1 capable of transmitting transmission waves SW in the above-mentioned two modes is used to perform a detection vehicle velocity correction process. Specifically, the radar device 1 first acquires a detection vehicle velocity from the vehicle velocity sensor 11 (STEP S1).

Next, the radar device 1 calculates the relative velocity of a still object P in each of the CW mode and the FM-CW mode (STEP S2). In STEP S2, the radar device calculates the relative velocity of the still object P. Here, the still object P is not a target determined as having a relative velocity equal to the detection vehicle velocity of the vehicle velocity sensor 11 in the above-mentioned still-object determining process.

The relative velocity of the still object P calculated in STEP S2 is considered as a value which can be estimated as a correct (actual) vehicle velocity by a calculating process to be described below. Specific calculation of the relative velocity of the still object P in the CW mode will be described below with high accuracy FIG. 7, and calculation of the relative velocity of the still object P in the FM-CW mode will be described below with reference to FIGS. 8A and 8B.

Subsequently, the radar device 1 calculates a first correction value on the basis of the detection vehicle velocity and the relative velocity of the still object P obtained in the CW mode, and calculates a second correction value on the basis of the detection vehicle velocity and the relative velocity of the still object P obtained in the FM-CW mode (STEP S3). Since the relative velocities of the still object P obtained in STEP S2 are values close to or equal to the correct vehicle velocity, for example, in the case where an error caused by the state of the wheel W is included in the detection vehicle velocity, deviations occur between the relative velocities of the still object P and the detection vehicle velocity. The first and second correction values are considered as values (correction factors) representing the ratios of the deviations, which will be described below.

Subsequently, the radar device 1 corrects the detection vehicle velocity on the basis of the first and second correction values. Exactly, the radar device corrects the detection vehicle velocity on the basis of at least one of the first and second correction values (STEP S4). In other words, in STEP S4, the radar device corrects the detection vehicle velocity including the error, using the first correction value and the like, such that the error is eliminated. In this way, in the present embodiment, it is possible to appropriately correct the detection vehicle velocity detected on the basis of rotation of the wheel W.

Also, in accordance with some environmental conditions such as weather and a time zone, the radar device 1 may not be able to sufficiently detect targets. In the present embodiment, since the first and second correction values are calculated in advance, even in the case where the radar device 1 cannot sufficiently detect targets and cannot the relative velocity of the still object P, it is possible to correct the detection vehicle velocity, using the first and second correction values.

<2. Specific Configuration of Radar Device>

Figure 2:
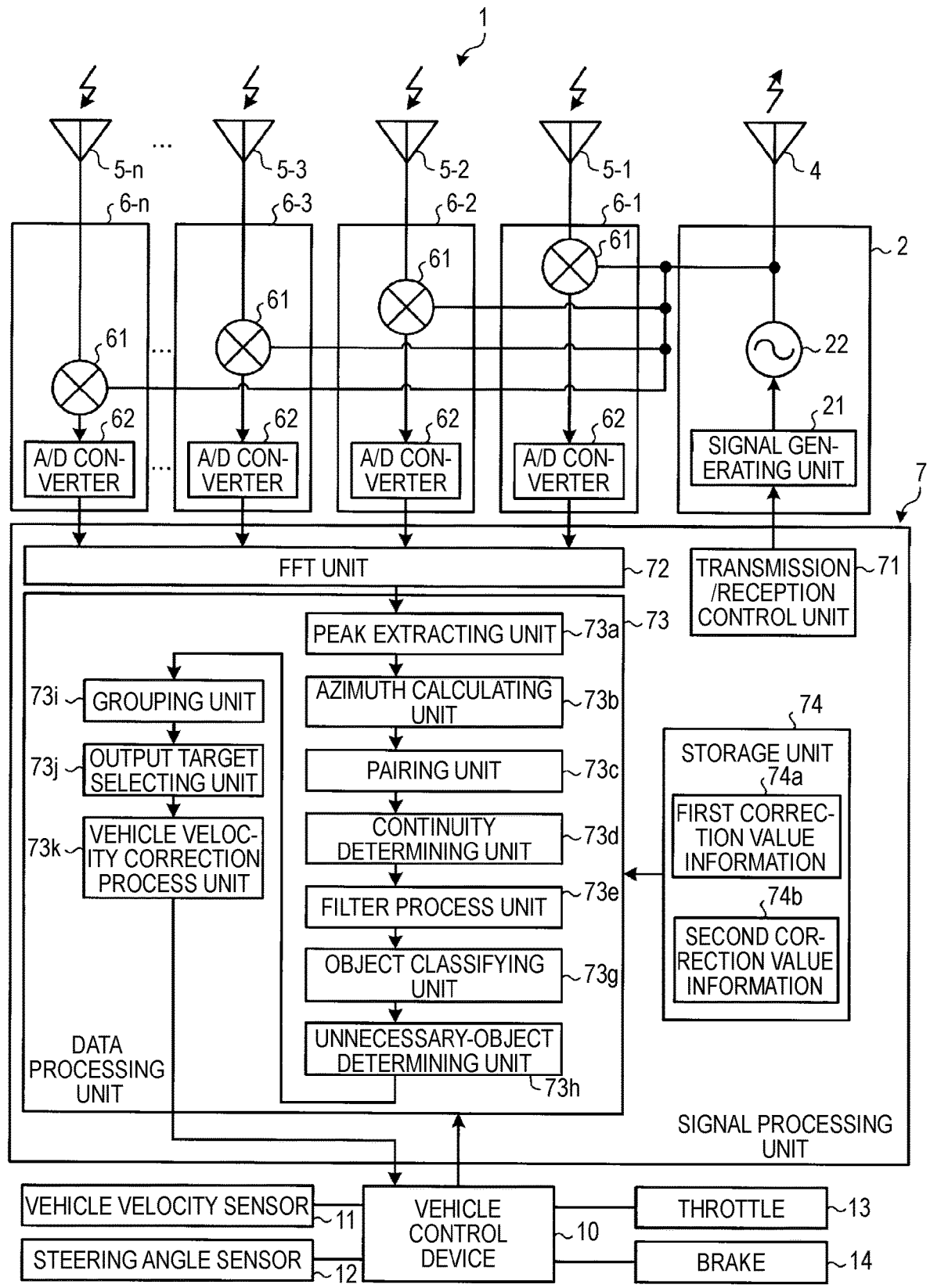
FIG. 2 is a block diagram of a radar device according to the embodiment.

Now, the configuration of the radar device 1 according to the embodiment will be described with reference to FIG. 2. FIG. 2 is a block diagram of the radar device 1 according to the embodiment. Also, in FIG. 2, only components necessary to explain features of the present embodiment are shown as a functional blocks, and general components are not shown.

In other words, the components shown in FIG. 2 are functionally conceptual, and do not need to have a physically configuration as shown in FIG. 2. For example, distribution or integration of the individual functional blocks is not limited to a specific mode shown in FIG. 2, and it is possible to distribute or integrate all or a part thereof functionally or physically in an arbitrary unit, depending on various loads, usage conditions, and so on.

As shown in FIG. 2, the radar device 1 includes a signal transmitting unit 2 and transmitting antennae 4 as components constituting a signal transmitting system. The signal transmitting unit 2 includes a signal generating unit 21 and an oscillator 22.

Also, the radar device 1 includes receiving antennae 5-1 to 5-n and signal receiving units 6-1 to 6-n as components constituting a signal receiving system. Each of the signal receiving units 6-1 to 6-n includes a mixer 61 and an A/D converter 62. Further, the radar device 1 includes a signal processing unit 7 as a component constituting a signal processing system.

Also, hereinafter, for ease of explanation, the receiving antennae 5-1 to 5-n will be collectively referred to as the receiving antennae 5. Similarly, the signal receiving units 6-1 to 6-n will be collectively referred to as the signal receiving units 6.

The signal transmitting unit 2 performs a process of generating transmission signals. The signal generating unit 21 generates modulation instruction signals for transmitting frequency-modulated millimeter waves having a triangular waveform, in the FM-CW mode, under control of a transmission/reception control unit 71 of the signal processing unit 7 to be described below.

Also, the signal generating unit 21 generates modulation instruction signals for transmitting unmodulated millimeter waves having a predetermined frequency, in the CW mode, under control of the transmission/reception control unit 71. The oscillator 22 generates transmission signals on the basis of modulation instruction signals generated by the signal generating unit 21.

Also, the FM-CW mode and the CW mode are controlled by the transmission/reception control unit 71, for example, such that signal transmission in the FM-CW mode is performed a predetermined number of times and then signal transmission in the CW mode is performed once, or such that the FM-CW mode and the CW mode are alternately repeated every several tens seconds.

The transmitting antennae 4 transmit transmission signals generated by the oscillator 42, as transmission waves, forward from the vehicle C. Also, as shown in FIG. 2, transmission signals generated by the oscillator 22 are distributed even to the mixers 61 to be described below.

If transmission waves transmitted from the transmitting antennae 4 are reflected from a target, the receiving antennae 5 receive the reflected waves coming from the target, as reception signals. Each of the signal receiving units 6 performs a preliminary process on each reception signal, thereby generating signals to be output to the signal processing unit 7.

Specifically, each of the mixers 61 mixes transmission signals distributed as described above, with reception signals received by a corresponding receiving antenna 5, thereby generating beat signals. Also, between each of the pairs of the receiving antennae 5 and the mixers 61, an amplifier may be disposed.

The A/D converters 62 convert beat signals generated by the mixers 61, into digital signals, and output the digital signals to the signal processing unit 7. The signal processing unit 7 includes the transmission/reception control unit 71, an FFT (Fast Fourier Transform) unit 72, a data processing unit 73, and a storage unit 74.

The data processing unit 73 includes a microcomputer and various circuits. The microcomputer includes, for example, a CPU (Central Processing Unit), a ROM (Read Only Memory), a RAM (Random Access Memory), input/output ports, and so on.

The data processing unit 73 includes a peak extracting unit 73a, an azimuth calculating unit 73b, a pairing unit 73c, a continuity determining unit 73d, a filter process unit 73e, an object classifying unit 73g, an unnecessary-object determining unit 73h, a grouping unit 73i, an output target selecting unit 73j, and a vehicle velocity correction process unit 73k.

Some or all of the individual processing units constituting the data processing unit 73 may be configured with hardware such as an ASIC (Application Specific Integrated Circuit), an FPGA (Field Programmable Gate Array), and the like.

The storage unit 74 is a storage device called a hard disk, a non-volatile memory, or a register, and is for storing first correction value information 74a and second correction value information 74b.

The first correction value information 74a includes information representing first correction values (for example, moving average values of first correction values) calculated by a correction value calculating unit 76c (see FIG. 6) to be described below, and the second correction value information 74b includes information representing second correction values (for example, moving average values of second correction values).

The transmission/reception control unit 71 controls the signal transmitting unit 2 including the above-described signal generating unit 21. Although not shown in the drawings, the transmission/reception control unit also appropriately controls the individual signal receiving units 6. The FFT unit 72 performs FFT on beat signals input from the individual A/D converters 62, and outputs the FFT results to the peak extracting unit 73a of the data processing unit 73.

The peak extracting unit 73a extracts peak frequencies of peaks, from the FFT results obtained by the FFT unit 72, and outputs the peak frequencies to the azimuth calculating unit 73b. Also, the peak extracting unit 73a extracts peak frequencies in each of UP sections and DN sections of beat signals (to be described below) in the FM-CW mode. Hereinafter, operations in the FM-CW mode will be mainly described. Peak extraction results in the CW mode may be used mainly to guarantee the accuracy of process results in the FM-CW mode.

The azimuth calculating unit 73b calculates the incident angles of reflected waves corresponding to the peak frequencies extracted in the peak extracting unit 73a, and the signal intensities (reception levels) thereof. At this time, since the incidence angles include angles based on phase wrapping, and are estimates of the angles at which the targets exist. Therefore, hereinafter, they will be referred to as estimate angles. Also, the azimuth calculating unit 73b outputs the calculated estimate angles and the calculated reception levels to the pairing unit 73c.

On the basis of the calculation results of the azimuth calculating unit 73b, the pairing unit 73c determines correct pairs of peak frequencies of the UP sections and the DN sections, and calculates the distance and relative velocity of each target from the pairing results. Also, the pairing unit 73c outputs information including the estimate angles, distances, and relative velocities of the individual targets to the continuity determining unit 73d.

Figure 3A:
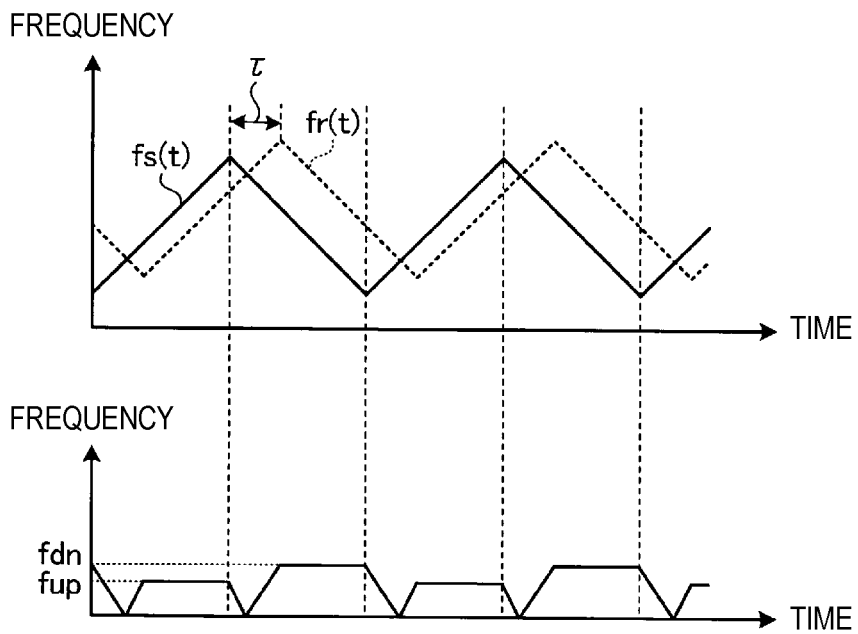
FIG. 3A is a view for explaining a procedure from a preliminary process for a signal processing device to a peak extracting process of the signal processing device according to the embodiment.
Figure 3B:
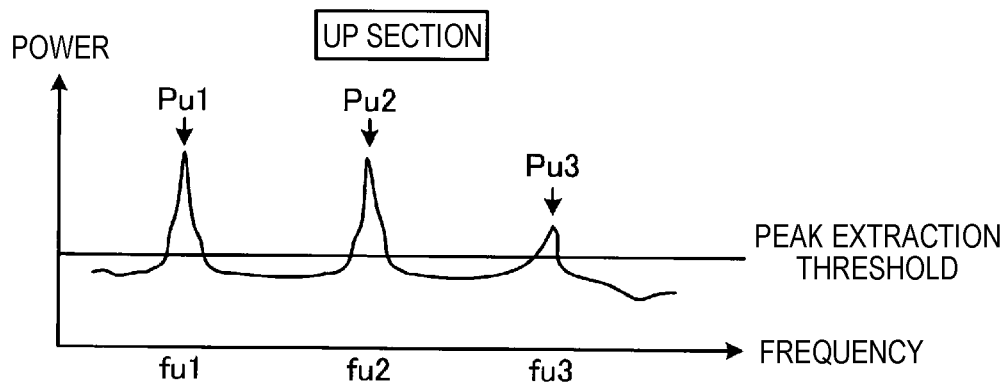
FIG. 3B is a view for explaining the procedure from the preliminary process for the signal processing device to the peak extracting process of the signal processing device according to the embodiment.
Figure 3C:
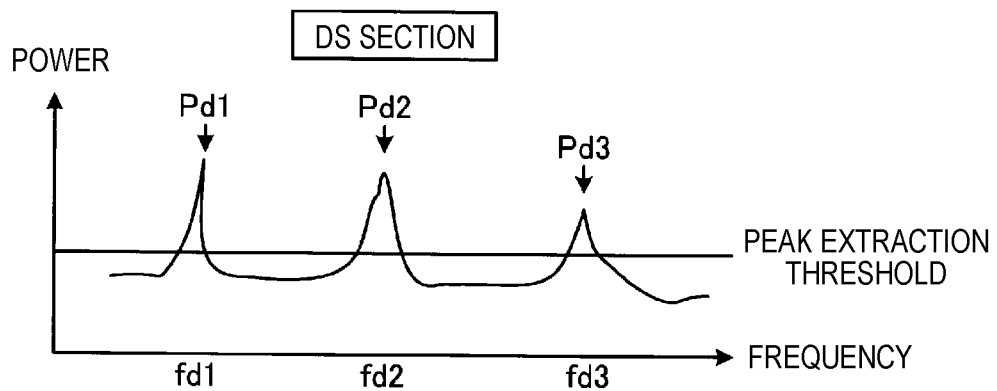
FIG. 3C is a view for explaining the procedure from the preliminary process for the signal processing device to the peak extracting process of the signal processing device according to the embodiment.

Now, the procedure of above-described processes which the signal processing unit 7 performs in FM-CW mode will be described with reference to FIGS. 3A, 3B, 3C, 4A, 4B, and 4C. FIGS. 3A, 3B, and 3C are views for explaining the procedure from the preliminary process for the signal processing unit 7 to the peak extracting process of the signal processing unit 7 according to the embodiment.

Figure 4A:
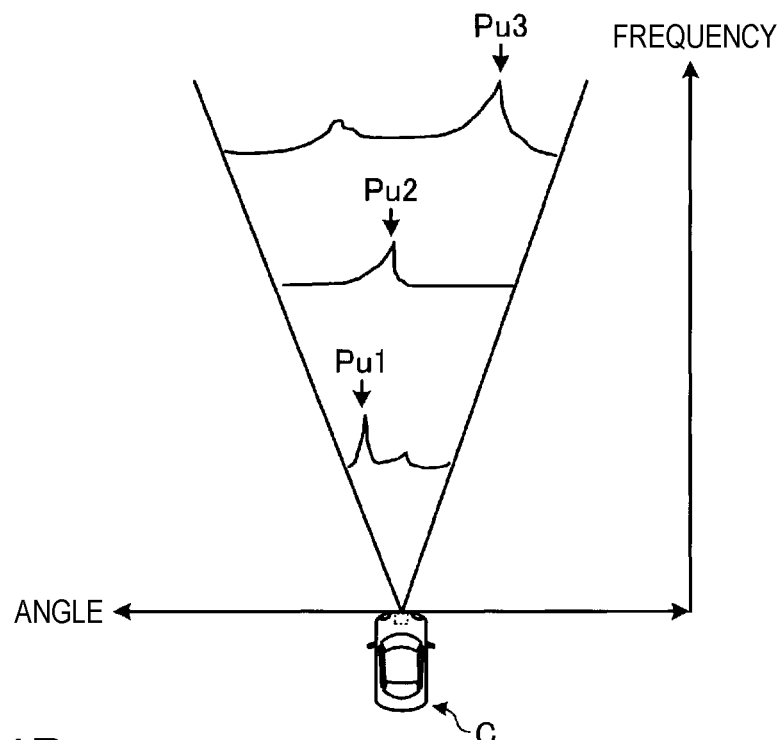
FIG. 4A is a view for explaining an azimuth calculating process according to the embodiment.
Figure 4B:
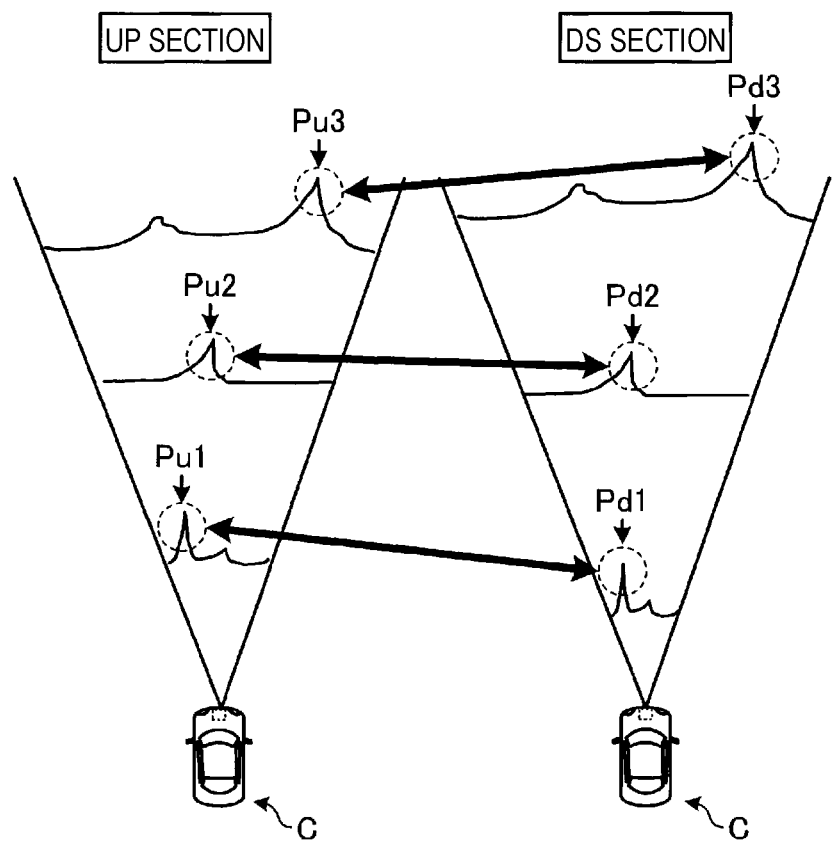
FIG. 4B is a view for explaining a first part of a pairing process according to the embodiment.
Figure 4C:
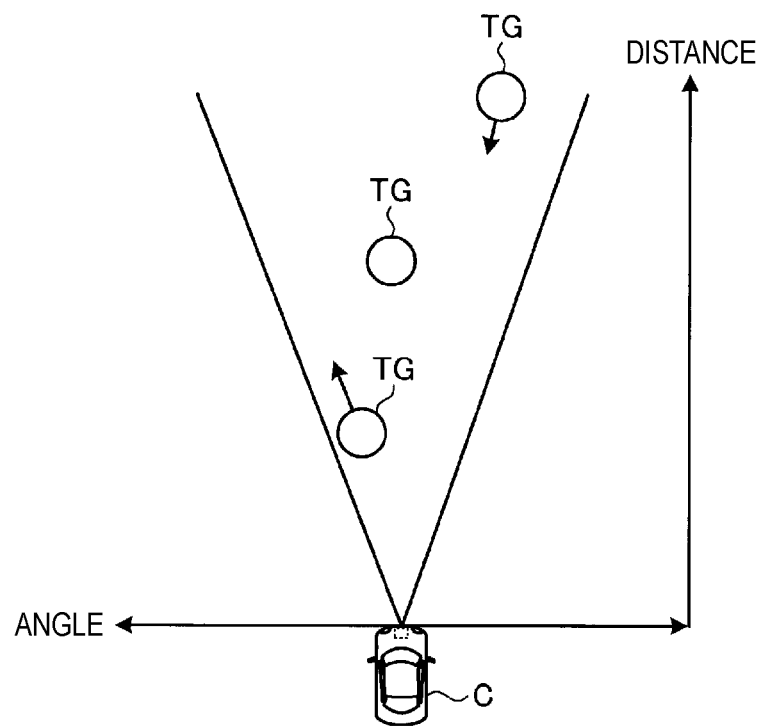
FIG. 4C is a view for explaining a second part of the pairing process according to the embodiment.

Also, FIG. 4A is a view for explaining the azimuth calculating process according to the embodiment. Further, FIG. 4B is a view for explaining a first part of the pairing process according to the embodiment. Moreover, FIG. 4C is a view for explaining a second part of the pairing process according to the embodiment.

As shown in FIG. 3A, after a transmission signal fs(t) is transmitted as a transmission wave from the transmitting antennae 4, if the reflected waves of the transmission wave from targets reach the radar device, the reflected waves are received as a reception signal fr(t) by each receiving antenna 5.

In this case, as shown in FIG. 3A, with respect to the transmission signal fs(t), the reception signal fr(t) has a time lag τ according to the distance between the vehicle C and the target. The reception signal fr(t) and the transmission signal fs(t) are mixed, whereby a beat signal is obtained as an output signal. In the beat signal, due to the Doppler effect based on the relative velocity between the vehicle C and the target, the frequency fup of UP sections in which the frequency increases and the frequency fdn of DN sections in which the frequency decreases are repeated.

FIG. 3B schematically shows the UP sections of the result which the FFT unit 72 obtains by performing FFT on the beat signals. Also, FIG. 3C schematically shows the DN sections of the result which the FFT unit 72 obtains by performing FFT on the beat signals.

In the frequency domain, the UP sections and the DN sections of the FFT result have waveforms as shown in FIGS. 3B and 3C, respectively. From those waveforms, the peak extracting unit 73a extracts peak frequencies having the maximum signal intensities (peaks).

For example, in the example shown in FIG. 3B, with reference to a peak extraction threshold, in the UP sections, peaks Pu1 to Pu3 are determined as peaks, and their peak frequencies fu1 to fu3 are extracted.

Also, as shown in FIG. 3C, in the DN sections, similarly, with reference to the peak extraction threshold, peaks Pd1, Pd2, and Pd3 are determined as peaks, and their peak frequencies fd1, fd2, and fd3 are extracted.

Meanwhile, some peak frequencies extracted by the peak extracting unit 73a may include frequency components corresponding to reflected waves from a plurality of targets. For this reason, the azimuth calculating unit 73b performs azimuth calculation on each of the peak frequencies, thereby analyzing whether a target corresponding to the corresponding peak frequency exists.

The azimuth calculating unit 73b performs the azimuth calculation using a predetermined incidence direction estimating method such as ESPRIT (Estimation of Signal Parameters via Rotational Invariance Techniques). However, the present invention is not limited thereto.

FIG. 4A is a view schematically illustrating the result of the azimuth calculation of the azimuth calculating unit 73b. From the peaks Pu1 to Pu3 of the azimuth calculation result, the azimuth calculating unit 73b calculates estimate angles of targets corresponding to the peaks Pu1 to Pu3, respectively. Also, the magnitudes of the peaks Pu1 to Pu3 are handled as reception levels. The azimuth calculating unit 73b performs the azimuth calculating process on each of the UP sections and the DN sections.

Then, on the basis of the azimuth calculation result of the azimuth calculating unit 73b, the pairing unit 73c performs pairing such that peaks constituting each pair have similar estimate angles and similar reception levels, as shown in FIG. 4B. Also, on the basis of the pairs of peaks, the pairing unit 73c calculates the distance and relative velocity of each of the targets corresponding to the pairs of peaks. The distance of each target is calculated on the basis of the following relationship: [Distance]∝(fup+fdn). The relative velocity of each target is calculated on the basis of the following relationship: [Velocity]∝(fup−fdn).

In this way, the pairing unit 73c obtains pairing results representing the estimate angles, distances, and relative velocities of the individual targets TG with respect to the vehicle C as shown in FIG. 4C. Then, the pairing unit 73c outputs the pairing results to the continuity determining unit 73d.

Hereinafter, FIG. 2 will be further described with respect to the continuity determining unit 73d. With respect to the instantaneous value of each of the targets obtained as determination objects by the current scanning, the continuity determining unit 73d determines whether the corresponding instantaneous value has continuity with any target detected by the previous scanning.

Specifically, the continuity determining unit calculates estimate positions of current positions from target positions obtained in the past scanning, and if an instantaneous value obtained in the current scanning is close to an estimate position, the continuity determining unit determines that the corresponding instantaneous value has continuity. Then, the continuity determining unit 73d outputs information on the targets subjected to continuity determination to the filter process unit 73e.

The filter process unit 73e is a processing unit for correcting variation of instantaneous values by a filter process of averaging a plurality of instantaneous values sequentially processed with respect to each detected target. The filter process unit 73e outputs information on the targets subjected to the filter process, to the object classifying unit 73g.

The object classifying unit 73g classifies the targets into moving objects (such as preceding vehicles and oncoming vehicles) and still objects on the basis of the filter process result of the filter process unit 73e. However, the object classifying unit 73g may be configured to classify targets having relative velocities equal to the detection vehicle velocity corrected in the vehicle velocity correction process unit 73k to be described below, as still objects. Also, the object classifying unit 73g outputs the classification result to the unnecessary-object determining unit 73h.

The unnecessary-object determining unit 73h determines whether each target is unnecessary for system control. Examples of unnecessary targets include targets corresponding to ghosts which are caused by wrapping attributable to phase differences exceeding 360 degrees, targets corresponding to reflection of constructions and walls, and so on. Also, basically, information on unnecessary targets is not output to an external device; however, the corresponding information may be held inside. Then, the unnecessary-object determining unit 73h outputs information on targets determined as necessary, to the grouping unit 73i.

If some of a plurality of targets detected as actually existing targets are assumed to be reflection points of the same object, the grouping unit 73*i* groups those targets into one target, and outputs the grouping result to the output target selecting unit 73*j*.

The output target selecting unit 73*j* selects targets which need to be output to the external device for system control. Also, the output target selecting unit 73*j* outputs target information items on the selected targets (including the actual angles, the actual distances, the actual relative velocities, and so on) to the vehicle velocity correction process unit 73*k*.

The vehicle velocity correction process unit 73*k* performs a process of correcting the detection vehicle velocity output from the vehicle velocity sensor 11. The configuration and the like of the vehicle velocity correction process unit 73*k* will be described with reference to FIG. 6 and the subsequent drawings. The vehicle velocity correction process unit 73*k* outputs information on the corrected detection vehicle velocity and target information on the targets to the external device.

Figure 5:
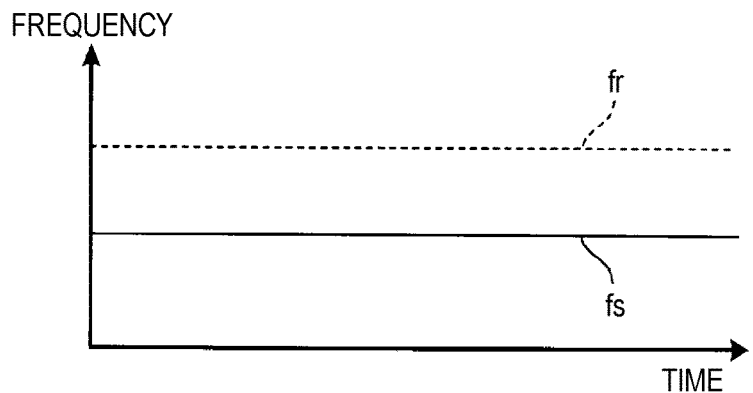
FIG. 5 is a view illustrating the relation between the frequencies of a transmission wave and a reception wave and time in a CW mode.

Now, the CW mode will be described with reference to FIG. 5. FIG. 5 is a view illustrating the relation between the frequencies of a transmission wave fs and a reception wave fr and time in the CW mode. As shown in FIG. 5, in the CW mode, the signal transmitting unit 2 transmits an electric wave having a predetermined frequency (a transmission wave fs) without performing frequency modulation.

Figure 7:
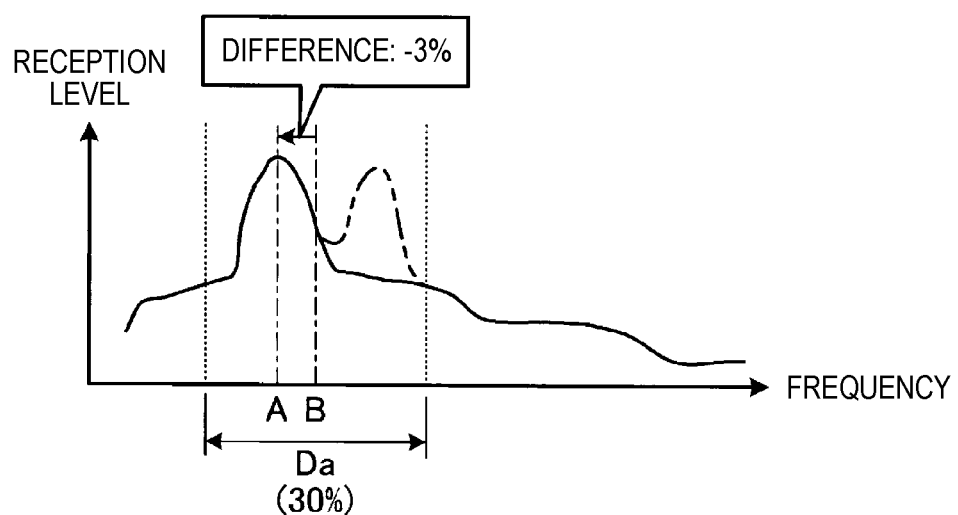
FIG. 7 is a view illustrating the waveform of a reception wave which is a reflected wave from a target in the CW mode.

In the CW mode, as described above, it is possible to detect the relative velocities of targets. For example, in the case where the velocity of a target is different from the velocity of the vehicle, since a Doppler effect occurs, if a reception signal and a transmission signal are mixed in a mixer 61, and high-frequency components are filtered out, only a low-frequency Doppler signal remains. If Fourier transform is performed on the Doppler signal, the received electric wave which is the reflected wave (reception wave fr) from the target and represents the relative velocity of the target is obtained. The waveform of the received electric wave is shown in FIG. 7 to be described below.

In the description of FIG. 2, the above-mentioned external device is, for example, a vehicle control device 10. The vehicle control device 10 is an electronic control unit (ECU) for controlling the component units of the vehicle C. The vehicle control device 10 is electrically connected to the vehicle velocity sensor 11, a steering angle sensor 12, a throttle 13, and a brake 14.

On the basis of target information acquired from the radar device 1, the vehicle control device 10 performs vehicle control such as adaptive cruise control (ACC) or pre-crash safety system (PCS) control.

For example, in the case of performing ACC, the vehicle control device 10 controls the throttle 13 and the brake 14 on the basis of target information acquired from the radar device 1, such that the vehicle C follows a preceding vehicle running in the same lane while keeping a constant distance between the vehicle C and the preceding vehicle. Also, since the running condition of the vehicle C such as the detection vehicle velocity, the steering angle, and the like frequently varies, whenever the running condition changes, the vehicle control device 10 acquires information from the vehicle velocity sensor 11, the steering angle sensor 12, and so on, and feeds back the acquired information to the radar device 1.

Also, for example, in the case of performing PCS control, if it is detected on the basis of target information acquired from the radar device 1 that there is a preceding vehicle, a still object, or the like in the traveling direction of the vehicle C, and the vehicle C is likely to collide with that, the vehicle control device 10 decelerates the vehicle C by controlling the brake 14. Also, for example, the vehicle control device warns people riding in the vehicle C by an alarm, or tightens up the seat belts in the vehicle, thereby holding the people in the seats.

<3. Specific Configuration of Vehicle Velocity Correction Process Unit>

Figure 6:
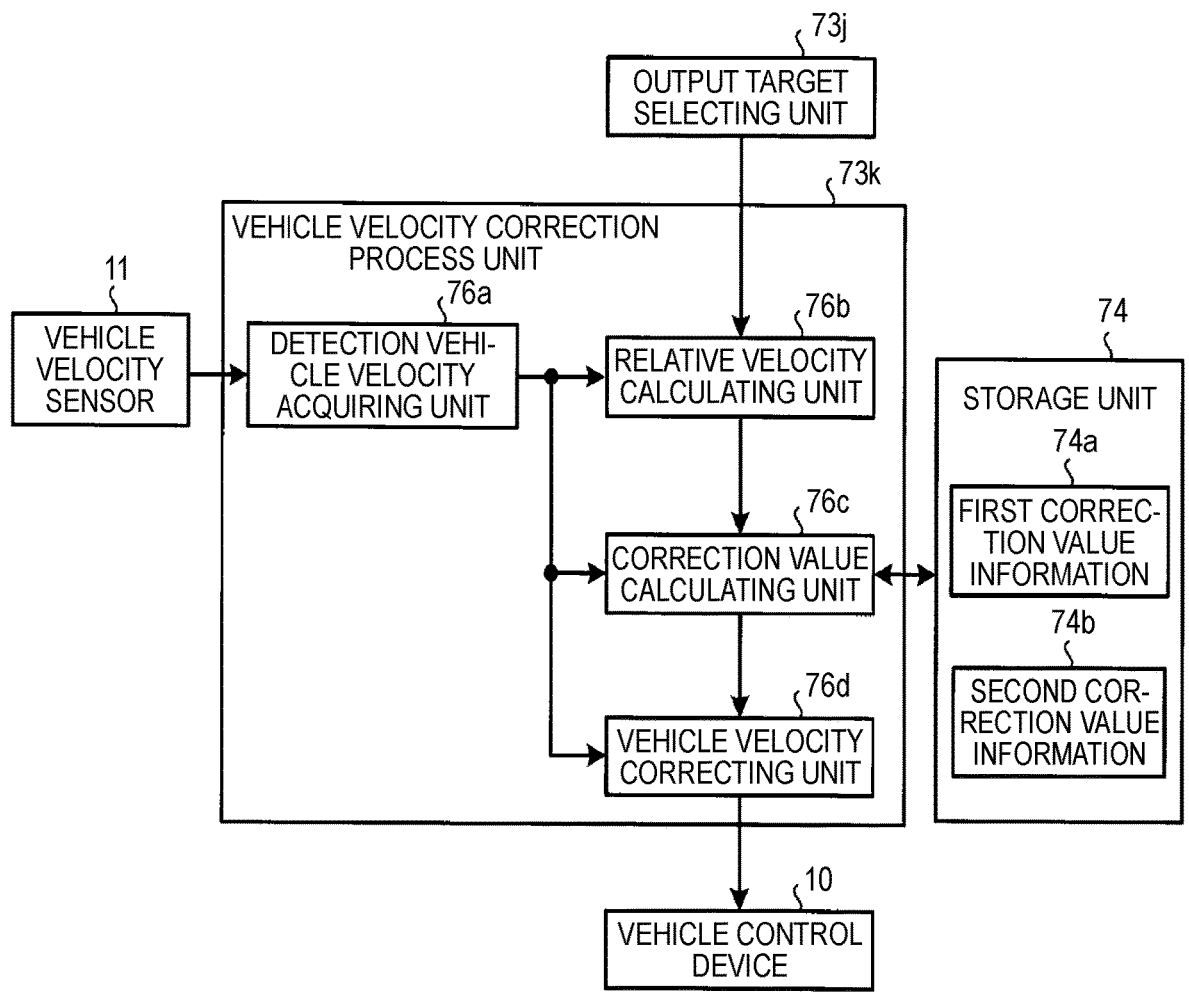
FIG. 6 is a block diagram of a vehicle velocity correction process unit according to the embodiment.

Now, the vehicle velocity correction process unit 73*k* will be described in detail with reference to FIG. 6. FIG. 6 is a block diagram of the vehicle velocity correction process unit 73*k* according to the embodiment.

As shown in FIG. 6, the vehicle velocity correction process unit 73*k* includes a detection vehicle velocity acquiring unit 76*a*, a relative velocity calculating unit 76*b*, the correction value calculating unit 76*c*, and a vehicle velocity correcting unit 76*d*.

The detection vehicle velocity acquiring unit 76*a* acquires information representing the detection vehicle velocity input from the vehicle velocity sensor 11. The detection vehicle velocity acquiring unit 76*a* outputs the acquired information representing the detection vehicle velocity to the relative velocity calculating unit 76*b*, the correction value calculating unit 76*c*, and the vehicle velocity correcting unit 76*d*.

The relative velocity calculating unit 76*b* calculates the relative velocity of the still object P on the basis of the frequency of the reflected wave of the transmission wave from the target in each of the CW mode and the FM-CW mode.

Hereinafter, first, calculation of the relative velocity of the still object P in the CW mode will be described with reference to FIG. 7. FIG. 7 is a view illustrating the waveform of the received electric wave which is the reflected wave from the target in the CW mode. Also, in FIG. 7, the horizontal axis represents the frequency of the received electric wave, and the vertical axis represents the reception level (power) of the received electric wave.

Here, the frequency of the received electric wave in the CW mode is determined according to the relative velocity of the target. Since received electric waves from a plurality of targets of the still object P have the same relative velocity, the frequencies of the received electric waves from those targets are equal to or almost equal to each other.

Therefore, as shown in FIG. 7, the reception level of the received electric wave increases at a frequency corresponding to the relative velocity of the still object P, and a peak is formed. However, it is possible to arbitrarily set a reception level condition for determining peaks. For example, in the case where the reception level is equal to or higher than a predetermined threshold, the reception level may be determined as a peak.

In the example shown in FIG. 7, since the reception level becomes a peak at a frequency "A", it is possible to estimate the frequency "A" as a frequency corresponding to the relative velocity of the still object P.

Also, the relation between the frequency of the received electric wave and the relative velocity is a relation in which the relative velocity increases as the frequency of the received electric wave increases (for example, a proportional relation). Therefore, the relative velocity calculating unit 76*b* can calculate the relative velocity of the still object P from the frequency "A". Then, the relative velocity calculating unit 76*b* outputs information representing the relative velocity of the still object P calculated, to the correction value calculating unit 76*c*.

Also, in the CW mode, the number of peaks of the reception level is not limited thereto one. Therefore, the relative velocity calculating unit 76*b* may be configured to calculate the relative velocity of a still object P in the CW mode if the number of peaks of the reception level of a reflected wave in frequency is one. In other words, the relative velocity calculating unit may be configured not to calculate the relative velocity of a still object P if the number of peaks is zero, or two or more.

Such peaks will be described in more detail with reference to FIG. 7. The relative velocity calculating unit 76b first converts the detection vehicle velocity into a frequency. In FIG. 7, it is assumed that a frequency "B" is a frequency corresponding to the detection vehicle velocity.

Then, in the case where the number of peaks of the reception level included in a predetermined frequency range Da including the frequency "B" is one, the relative velocity calculating unit 76b calculates the relative velocity of the still object P, thereby capable of surely detecting the peak of the received electric wave from the still object P and calculating the accurate relative velocity of the still object P.

In other words, even though the detection vehicle velocity includes an error, it is rare for the detection vehicle velocity to significantly shift from the actual vehicle velocity. Therefore, if the peak of the reception level is included in the predetermined frequency range Da with reference to the frequency "B" corresponding to the detection vehicle velocity, it is possible to assume that the corresponding peak corresponds to the still object P. Therefore, the relative velocity calculating unit 76b can calculate the accurate relative velocity of the still object P.

For example, in the case where the predetermined frequency range Da is a range between −15% and +15% with reference to the frequency "B" (i.e. a range of 30%), when the frequency "A" corresponds to a relative velocity of 58.2 km/h, and the frequency "B" corresponds to a relative velocity of 60.0 km/h, the difference of the frequency "A" from the frequency "B" becomes −3%. In other words, the difference between the frequency "A" and the frequency "B" is included in the predetermined frequency range Da. However, specific numerical values defining the predetermined frequency range Da are not limited to the above-mentioned values. For example, the predetermined frequency range may be a range between −20% and +20% with reference to the frequency "B", a range between −40% and +40% with reference to the frequency "B", or any other range.

Also, as shown by an imaginary line in FIG. 7, for example, in the case where the number of peaks of the reception level included in the predetermined frequency range Da is two, for example, it is assumed that one peak corresponds to a the still object P and the other peak corresponds to a low-velocity moving object. However, since it is unclear which peak corresponds to the still object P, the relative velocity calculating unit 76b does not calculate the relative velocity. Therefore, it is possible to prevent the relative velocity calculating unit from erroneously calculating, for example, the relative velocity of the low-velocity moving object as the relative velocity of the still object P.

Figure 8A:
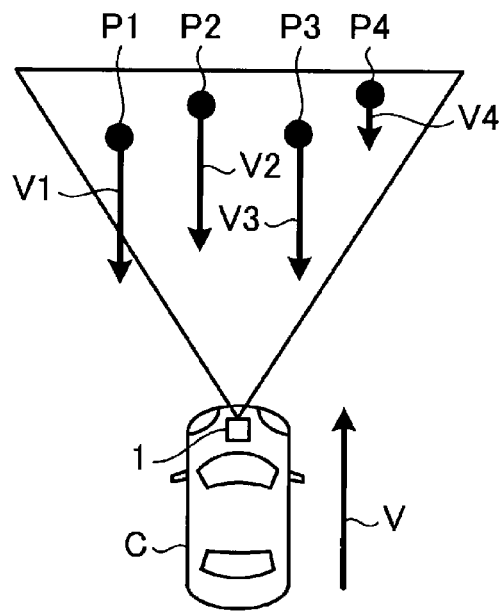
FIG. 8A is a schematic diagram illustrating a target detecting state in an FM-CW mode.

Now, calculation of the relative velocity of the still object P in the FM-CW mode will be described with reference to FIGS. 8A and 8B. FIG. 8A is a schematic diagram illustrating a state where targets are detected in the FM-CW mode, and FIG. 8B is a view illustrating the relation between the relative velocities of the detected targets and the detection vehicle velocity.

First, in the example shown in FIG. 8A, the case where four targets P1 to P4 have been detected by the radar device 1 is shown, and it is assumed that it has been detected that the targets P1 to P4 have relative velocities V1 to V4, respectively. Also, here, it is assumed that the targets P1 to P3 correspond to a still object, and the target P4 corresponds to a moving object.

Here, for example, in the case where an error is included in the detection vehicle velocity V, it is difficult to accurately determine whether each of the targets P1 to P4 corresponds to a still object or a moving object by comparing the detection vehicle velocity V with each of the relative velocities V1 to V4 of the targets P1 to P4.

Figure 8B:
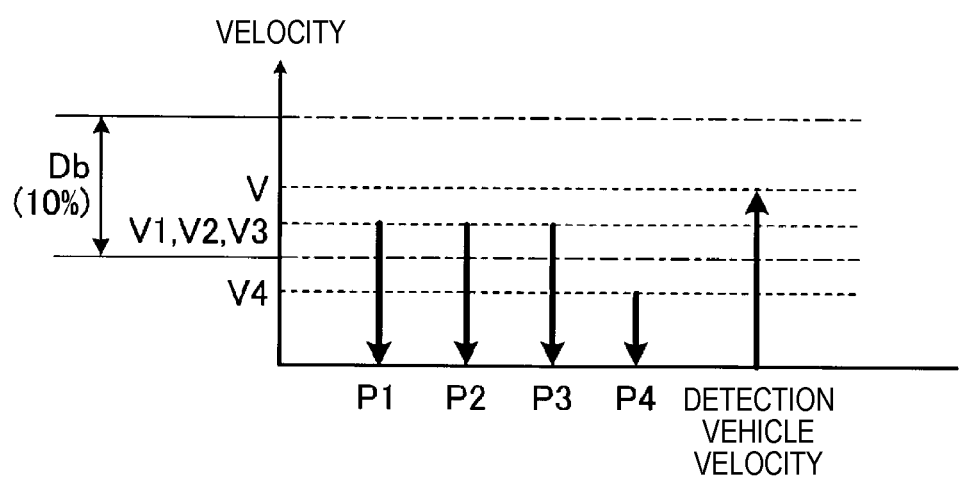
FIG. 8B is a view illustrating the relation between the relative velocities of detected targets and a detection vehicle velocity.

For this reason, in the FM-CW mode, as shown in FIG. 8B, the relative velocity calculating unit 76b according to the present embodiment selects targets (here, targets P1 to P3) having relative velocities in a predetermined velocity range Db including the detection vehicle velocity V, from the targets P1 to P4. Then, the relative velocity calculating unit 76b calculates the relative velocities V1 to V3 of the selected targets P1 to P3, as relative velocities related to the still object, and averages the relative velocities.

Therefore, even in the case where the detection vehicle velocity includes an error, it is possible to calculate the relative velocity of the still object on the basis of the relative velocities V1 to V3 of the targets P1 to P3. In other words, as described above, even in the case where the detection vehicle velocity includes an error, it is rare for the detection vehicle velocity to significantly shift from the actual vehicle velocity.

Therefore, if there is a target having a relative velocity in the predetermined velocity range Db including the detection vehicle velocity, it is possible to assume that the corresponding target corresponds to the still object. Further, it is possible to accurately calculate the relative velocity of the still object P by averaging the relative velocities of the plurality of targets assumed to correspond to the still object.

Also, although not shown in the drawings, for example, even though the relative velocity of a low-velocity moving object is mixed in the predetermined velocity range Db and is used to calculate the relative velocity of the still object P, since the relative velocity of the still object P is calculated by averaging many relative velocities assumed to correspond to the still object, it is possible to reduce influence due to the mixture of the moving object. Also, the predetermined velocity range Db is, for example, a range between −5% and +5% with reference to the frequency "B" (i.e. a range of 10%). However, the specific numerical values of the predetermined velocity range Db are just illustrative, and are not limited. For example, the predetermined velocity range may be a range between −2% and +2% with reference to the detection vehicle velocity, or any other range.

Referring to FIG. 6 again, the relative velocity calculating unit 76b outputs information representing the relative velocity of the still object P calculated in each of the CW mode and the FM-CW mode, to the correction value calculating unit 76c.

The correction value calculating unit 76c calculates a first correction value on the basis of the detection vehicle velocity and the relative velocity of the still object P calculated in the CW mode. The first correction value is, for example, a value (a correction factor) obtained by dividing the relative velocity of the still object P calculated in the CW mode by the detection vehicle velocity. However, the first correction value is not limited thereto, and may be a value representing how much the detection vehicle velocity has shifted from the relative velocity of the still object P calculated in the CW mode.

Subsequently, the correction value calculating unit 76c reads out the moving average value of first correction values obtained until the previous process, from the first correction value information 74a, and updates the first correction value information 74a with a moving average value reflecting the first correction value calculated in the current process.

Also, the correction value calculating unit 76c calculates a second correction value on the basis of the detection vehicle velocity and the relative velocity of the still object P calculated in the FM-CW mode. Similarly to the first correction value, the second correction value is, for example, a value (a correction factor) obtained by dividing the relative velocity of the still object P calculated in the FM-CW mode by the detection vehicle velocity. However, the second correction value is not limited thereto, and may be a value representing how much the detection vehicle velocity has shifted from the relative velocity of the still object P calculated in the FM-CW mode.

Subsequently, the correction value calculating unit 76c reads out the moving average value of second correction values obtained until the previous process, from the second correction value information 74b, and updates the second correction value information 74b with a moving average value reflecting the second correction value calculated in the current process.

Subsequently, the correction value calculating unit 76c outputs information representing the first and second correction values calculated (specifically, information on the moving average values of the first and second correction values updated) to the vehicle velocity correcting unit 76d. As described above, the first and second correction values are calculated on the basis of the detection vehicle velocity and the relative velocities of the still object P calculated in the corresponding modes, respectively. However, the first and second correction values are not limited thereto. For example, each correction value may be calculated on the basis of a frequency corresponding to the relative velocity of the still object P and a frequency corresponding to the detection vehicle velocity.

The vehicle velocity correcting unit 76d corrects the detection vehicle velocity using at least of the first correction value and the second correction value. Specifically, the vehicle velocity correcting unit 76d first performs a first correcting process of correcting the detection vehicle velocity using the first correction value, and then performs a second correcting process of correcting the detection vehicle velocity using the second correction value.

Here, if the first correcting process and the second correcting process are compared, the first correction value to be used in the first correcting process can be easily calculated. In other words, since the predetermined frequency range Da in the CW mode is set to be relatively wide, even though an error included in the detection vehicle velocity is large, it is easy for the peak of the reception level to appear in the predetermined frequency range Da. Therefore, in the CW mode, the relative velocity of the still object P necessary to obtain the first correction value can be easily calculated. As a result, the first correction value can be easily calculated. Consequently, even though an error included in the detection vehicle velocity is large, it is possible to perform the first correcting process. In other words, the first correcting process can correct the detection vehicle velocity in a wide range.

Meanwhile, the second correcting process has high correction accuracy. In other words, since the relative velocity of the still object P which is calculated in the FM-CW mode is the average of the relative velocities of the plurality of targets selected as targets corresponding to the still object from the detected targets, even though the relative velocity of a moving object is mixed, since the influence of the relative velocity of the moving object is weakened, the relative velocity of the still object becomes a value close to the correct relative velocity of the still object P. Since the second correcting process uses the second correction value calculated on the basis of the relative velocity of the still object P, the correction accuracy becomes high.

On the basis of the characteristics of the first and second correcting processes, the vehicle velocity correcting unit 76d according to the present embodiment first performs the first correcting process, and then performs the second correcting process. Specifically, a possibility that, after start-up of the vehicle C, the wheel state has changed like replacement of the wheel W and the error of the detection vehicle velocity has increased is high. For this reason, the vehicle velocity correcting unit 76d according to the present embodiment first performs the first correcting process, thereby capable of roughly correcting the detection vehicle velocity. Then, for example, when having performed the first correcting process a predetermined number of times, the vehicle velocity correcting unit 76d can transition to the second correcting process, and corrects the detection vehicle velocity more accurately.

Also, the vehicle velocity correcting unit 76d may compare the first correction value and the second correction value after performing the second correcting process, and transition from the second correcting process to the first correcting process according to the comparison result. Specifically, the vehicle velocity correcting unit 76d may calculate the difference between the first correction value and the second correction value, and transition from the second correcting process to the first correcting process if the calculated difference (specifically, the absolute value of the difference) is equal to or greater than a predetermined value.

Therefore, for example, even in the middle of the second correcting process, if the second correction value is not accurately calculated, the vehicle velocity correcting unit can return to the first correcting process, thereby surely keeping correction on the detection vehicle velocity.

Then, the vehicle velocity correcting unit 76d outputs information representing the corrected detection vehicle velocity, and the like, to the vehicle control device 10. However, the vehicle velocity correcting unit 76d may output the information representing the corrected detection vehicle velocity, as information for a still-object determining process, to the object classifying unit 73g.

<4. Process Flow Chart>

Figure 9:
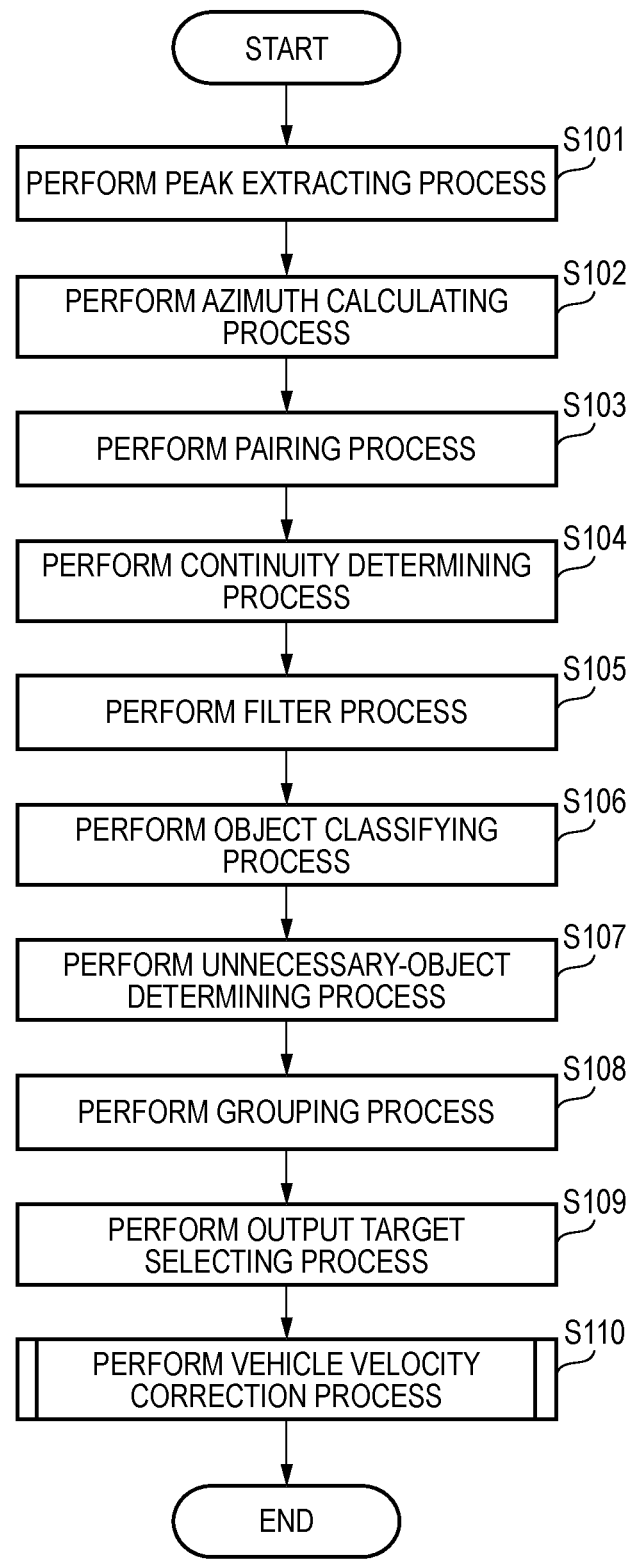
FIG. 9 is a flow chart illustrating a main process which is performed by a data processing unit of the radar device according to the embodiment.
Figure 10:
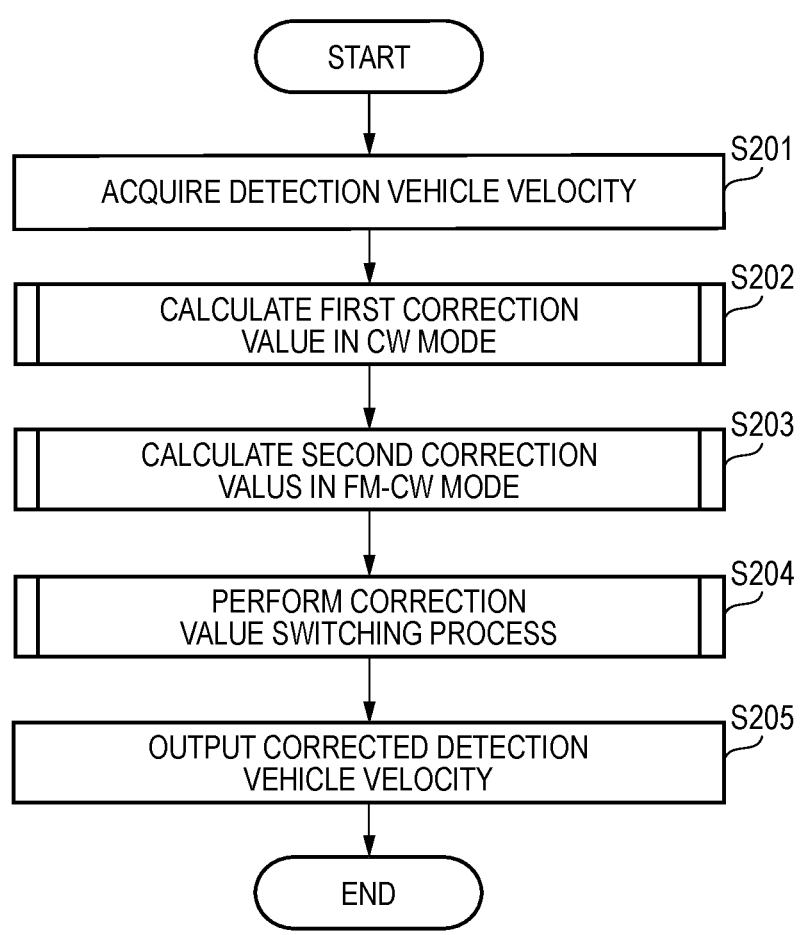
FIG. 10 is a flow chart illustrating a detection vehicle velocity correction process of the main process according to the embodiment.

Now, the procedure of processes which are performed by the data processing unit 73 of the radar device 1 according to the present embodiment will be described with reference to FIGS. 9 and 10. FIG. 9 is a flow chart illustrating a main process which is performed by the data processing unit 73 of the radar device 1 according to the embodiment. Also, FIG. 10 is a flow chart illustrating a detection vehicle velocity correction process of the main process according to the embodiment.

As shown in FIG. 9, first, the peak extracting unit 73a performs a peak extracting process on the basis of beat signals subjected to FFT and input from the FFT unit 72 (STEP S101). Subsequently, the azimuth calculating unit 73b performs an azimuth calculating process on the basis of the process result of the peak extracting process (STEP S102).

Thereafter, the pairing unit 73c performs a pairing process on the basis of the process result of the azimuth calculating process (STEP S103). Subsequently, the continuity determining unit 73d performs a continuity determining process on the basis of the process result of the pairing process (STEP S104). Thereafter, the filter process unit 73e performs a filter process on the basis of the process result of the continuity determining process (STEP S105).

Subsequently, the object classifying unit 73g performs an object classifying process on the basis of the process result of the filter process (STEP S106). Thereafter, the unnecessary-object determining unit 73h performs an unnecessary-object determining process on the basis of the process result of the object classifying process (STEP S107). Then, the grouping unit 73i performs a grouping process on the basis of the process result of the unnecessary-object determining process (STEP S108).

Subsequently, the output target selecting unit 73j performs an output target selecting process on the basis of the process result of the grouping process (STEP S109), and outputs target information on targets selected as output objects.

Next, the vehicle velocity correction process unit 73k performs a process of correcting the detection vehicle velocity on the basis of the target information on the targets and the like (STEP S110).

Now, the detection vehicle velocity correction process will be described with reference to FIG. 10. Also, the vehicle velocity correction process unit 73k repeatedly performs the process shown in FIG. 10 in a predetermined cycle.

As shown in FIG. 10, the vehicle velocity correction process unit 73k acquires the detection vehicle velocity (STEP S201). Subsequently, the vehicle velocity correction process unit 73k calculates the first correction value in the CW mode (STEP S202).

Figure 11:
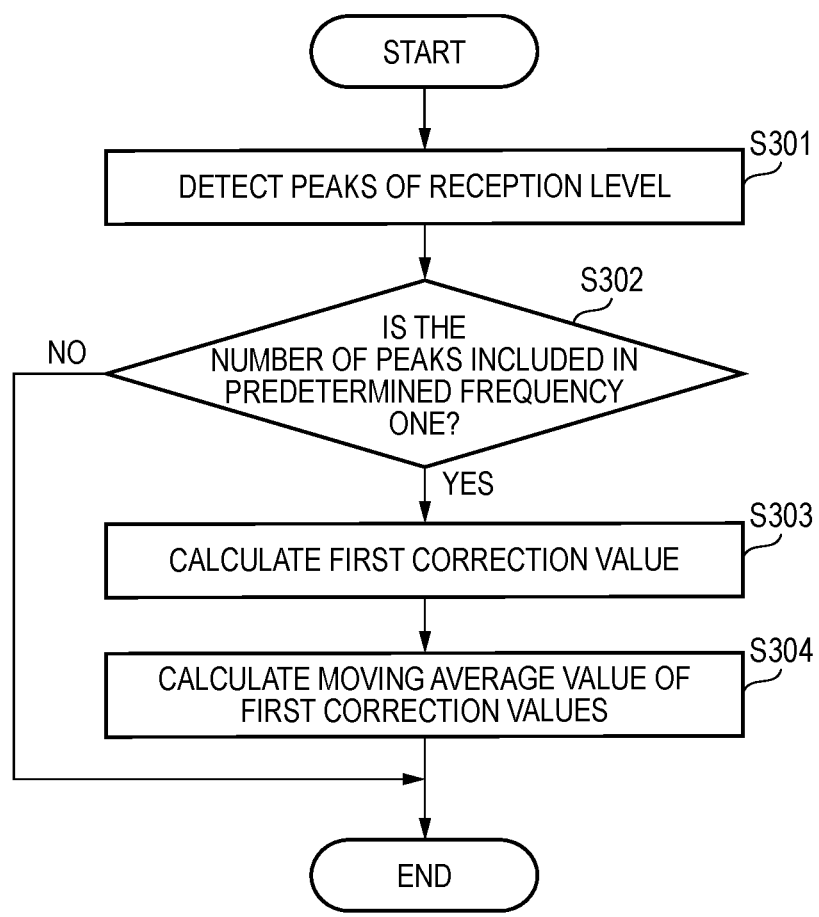
FIG. 11 is a flow chart illustrating a first correction value calculating process in the CW mode.

FIG. 11 is a flow chart illustrating the first correction value calculating process in the CW mode. As shown in FIG. 11, the vehicle velocity correction process unit 73k detects peaks of the reception level of each of the received electric waves which are the reflected waves from targets (STEP S301). Subsequently, the vehicle velocity correction process unit 73k determines whether the number of peaks of the reception level included in the predetermined frequency range Da is one (STEP S302).

In the case where it is determined that the number of peaks of the reception level included in the predetermined frequency range Da is not one ("No" in STEP S302), the vehicle velocity correction process unit 73k skips the subsequent processes. Meanwhile, in the case where it is determined that the number of peaks of the reception level included in the predetermined frequency range Da is one ("Yes" in STEP S302), the vehicle velocity correction process unit 73k obtains the relative velocity of a still object corresponding to the peak, and calculates a first correction value (STEP S303). Subsequently, the vehicle velocity correction process unit 73k calculates the moving average value of first correction values (STEP S304).

Figure 12:
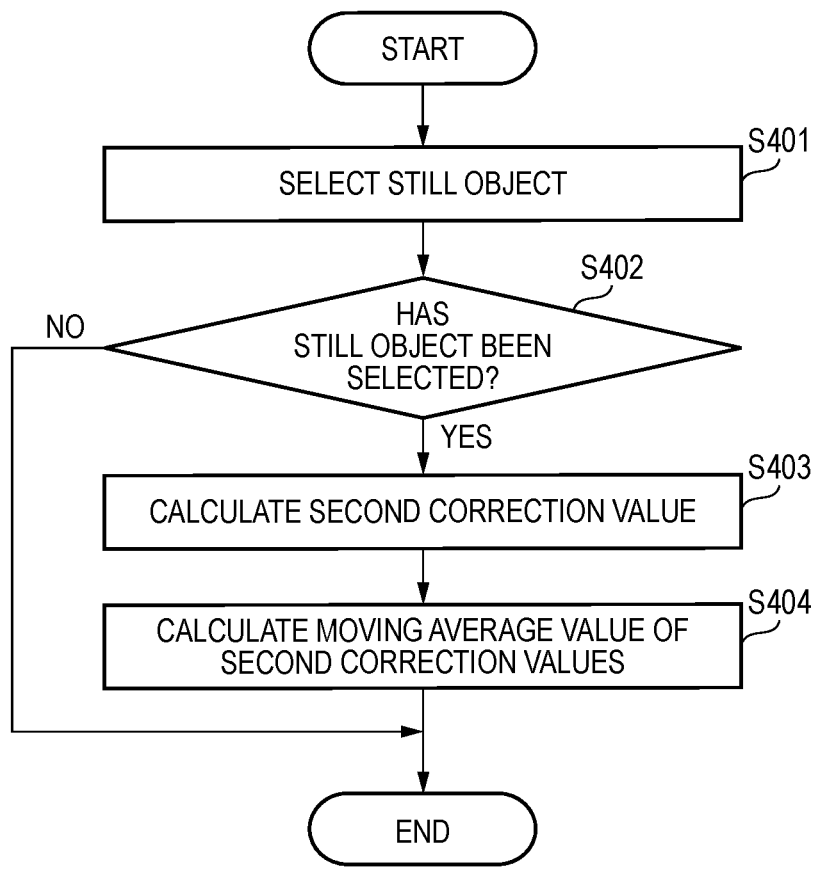
FIG. 12 is a flow chart illustrating a second correction value calculating process in the FM-CW mode.

Referring to FIG. 10 again, the vehicle velocity correction process unit 73k calculates a second correction value in the FM-CW mode (STEP S203). FIG. 12 is a flow chart illustrating the second correction value calculating process in the FM-CW mode.

As shown in FIG. 12, the vehicle velocity correction process unit 73k performs a process of selecting targets having relative velocities in the predetermined velocity range Db including the detection vehicle velocity (i.e. targets assumed to correspond to a still object) from the targets (STEP S401). Subsequently, the vehicle velocity correction process unit 73k determines whether targets assumed to correspond to a still object has been selected in the process of STEP S401 (STEP S402).

In the case where it is determined that any target assumed to correspond to a still object has not been selected ("No" in STEP S402), the vehicle velocity correction process unit 73k skips the subsequent processes. Meanwhile, in the case where it is determined that targets assumed to correspond to a still object have been selected ("Yes" in STEP S402), the vehicle velocity correction process unit 73k obtains the relative velocity of the still object, and calculates a second correction value (STEP S403). Subsequently, the vehicle velocity correction process unit 73k calculates the moving average value of second correction values (STEP S404).

Figure 13:
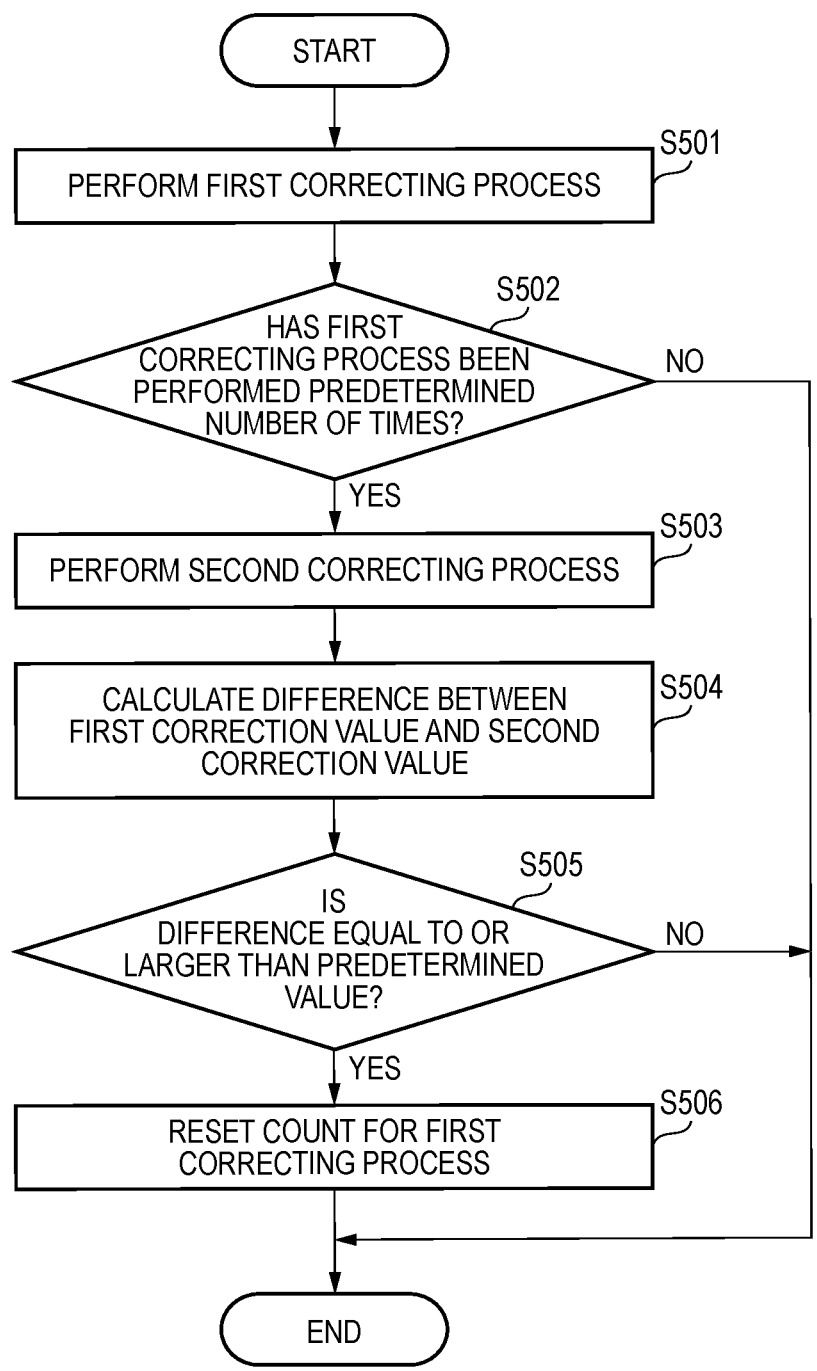
FIG. 13 is a flow chart illustrating a process of switching between first and second correction values.

Referring to FIG. 10 again, the vehicle velocity correction process unit 73k performs a process of switching between the first correction value and the second correction value. FIG. 13 is a flow chart illustrating the process of switching between the first correction value and the second correction value.

As shown in FIG. 13, the vehicle velocity correction process unit 73k first performs the first correcting process of correcting the detection vehicle velocity using the first correction value (STEP S501). The vehicle velocity correction process unit 73k determines whether the first correcting process has been performed a predetermined number of times (for example, five times) (STEP S502).

Here, the vehicle velocity correction process unit determines whether the first correcting process has been performed the predetermined number of times. However, the present invention is not limited thereto. For example, the vehicle velocity correction process unit may determine whether a predetermined time has elapsed since start of the first correcting process. In other words, here, the vehicle velocity correction process unit needs only to be able to determine whether the first correcting process has been performed for a certain amount of time.

In the case where it is determined that the first correcting process has not been performed the predetermined number of times ("No" in STEP S502), the vehicle velocity correction process unit 73k continues the first correcting process without performing the subsequent processes. Meanwhile, in the case where it is determined that the first correcting process has been performed the predetermined number of times ("Yes" in STEP S502), the vehicle velocity correction process unit 73k performs the second correcting process of correcting the detection vehicle velocity using the second correction value (STEP S503).

Subsequently, the vehicle velocity correction process unit 73k calculates the difference between the first correction value and the second correction value (STEP S504). Subsequently, the vehicle velocity correction process unit 73k determines whether the calculated difference is equal to or larger than the predetermined value, or not (STEP S505).

In the case where it is determined that the difference is equal to or larger than the predetermined value ("Yes" in STEP S505), the vehicle velocity correction process unit 73k resets the number of times the first correcting process has been performed (STEP S506). In other words, the vehicle velocity correction process unit 73k returns the count for the first correcting process to zero, and repeatedly performs STEP S501 and the subsequent processes. Meanwhile, in the case where it is determined that the difference is smaller than the predetermined value ("No" in STEP S505), the vehicle velocity correction process unit 73k continues the second correcting process and then finishes the process.

As described above, the vehicle velocity correction process unit 73k basically performs the process using the first correction value close to the actual vehicle velocity (the correct value). In other words, in the case where the difference of the second correction value from the first correction value is relatively large, the vehicle velocity correction process unit 73*k* assumes that the second correction value is a value different from the correct value, and uses the first correction value in the detection vehicle velocity correcting process.

Also, in the case where the difference of the second correction value from the first correction value is relatively small, the vehicle velocity correction process unit 73*k* assumes that the second correction value is a value closer to the correct value than the first correction value is, and uses the second correction value in the detection vehicle velocity correcting process. As described above, the first correction value is for calculating the relative velocity using only the peak frequency of the still object. Since the second correction value is related to the relative velocity which may include the peak frequency of a moving object, the first correction value becomes a value closer to the correct value than the second correction value is.

However, since a plurality of reception signals of the still object has one peak related to the first correction value, the frequency range becomes a relatively wide range. Therefore, the accuracy of the frequency (relative velocity) at the peak related to the first correction value is lower than that at a peak which is generated for each of the targets of the still object and the moving object like the peak related to the second correction value. In other words, since the peak frequency range for the peak related to the first correction value becomes a relatively wide range, when a certain frequency is specified as the frequency of the peak, the corresponding frequency may not represent the accurate value.

As a result, in the case where the difference of the second correction value from the first correction value is equal to or larger than the predetermined value, the vehicle velocity correction process unit 73*k* uses the first correction value, not the second correction value. Meanwhile, in the case where the difference of the second correction value from the first correction value is smaller than the predetermined value, the vehicle velocity correction process unit 73*k* uses the second correction value.

Referring to FIG. 10 again, the vehicle velocity correction process unit 73*k* outputs information on the detection vehicle velocity corrected on the basis of one of the first and second correction values, and information such as target information on the targets, to the external device, and finishes the process (STEP S205).

As described above, the radar device 1 according to the present embodiment includes the detection vehicle velocity acquiring unit 76*a*, the relative velocity calculating unit 76*b*, the correction value calculating unit 76*c*, and the vehicle velocity correcting unit 76*d*. The detection vehicle velocity acquiring unit 76*a* acquires the detection vehicle velocity detected on the basis of rotation of the wheel W. In each of the FM-CW mode for performing frequency modulation on a transmission wave and then transmitting the transmission wave to targets and the CW mode for transmitting a transmission wave to targets without performing frequency modulation on the transmission wave, if the reflected waves from the targets are received, the relative velocity calculating unit 76*b* calculates the relative velocity of the still object on the basis of the frequencies of the reflected waves.

The correction value calculating unit 76*c* calculates the first correction value on the basis of the detection vehicle velocity and the relative velocity of the still object in the CW mode, and calculates the second correction value on the basis of the detection vehicle velocity and the relative velocity of the still object in the FM-CW mode. The vehicle velocity correcting unit 76*d* corrects the detection vehicle velocity using at least one of the first correction value and the second correction value. Therefore, it is possible to appropriately correct the detection vehicle velocity detected on the basis of rotation of the wheel.

In the above-described embodiment, as an example, the radar device 1 has one transmitting antenna 4 and n-*n* umber of receiving antennae 5. However, as long as it is possible to detect a plurality of targets, the number of transmitting antennae and the number of receiving antennae may be changed.

Also, in the above-described embodiment, as an example of the incidence direction estimating method, ESPRIT has been taken. However, the present invention is not limited thereto. For example, DBF (Digital Beam Forming), PRISM (Propagator method based on an Improved Spatial-smoothing Matrix), MUSIC (Multiple Signal Classification), and so on may be used.

In the above-described embodiment, at least one of the first and second correction values is used to correct the detection vehicle velocity. However, the present invention is not limited thereto. Both of the first and second correction values may be used to correct the detection vehicle velocity. In this case, for example, the average value of the first and second correction values may be used.

Further, in the above-described embodiment, the vehicle velocity correction process is performed after the output target selecting process. However, the present invention is not limited thereto. For example, the vehicle velocity correction process may be performed at any timing after the object classifying process.

Various advantages and modifications can be easily achieved by those skilled in the art. Therefore, the invention in its broader aspects is not limited to the specific details and representative embodiments shown and described above. Accordingly, various modifications may be made without departing from the spirit or scope of the general inventive concept as defined by the appended claims and their equivalents.

What is claimed is:

1. A radar device comprising:
  a detection vehicle velocity acquiring unit configured to acquire a detection vehicle velocity detected on the basis of rotation of a wheel;
  a relative velocity calculating unit configured to calculate the relative velocity of a still object on the basis of the frequencies of the reflected waves of a transmission wave from targets in each of an FM-CW mode for transmitting a transmission wave to targets, which is applied frequency modulation and a CW mode for transmitting a transmission wave to targets, which is not applied the frequency modulation;
  a correction value calculating unit configured to calculate a first correction value on the basis of the detection vehicle velocity and the relative velocity of the still object obtained in the CW mode and calculate a second correction value on the basis of the detection vehicle velocity and the relative velocity of the still object obtained in the FM-CW modes wherein the calculated second correction value is obtained by dividing the relative velocity of the still object calculated in the FM-CW mode by the detection vehicle velocity, and
  wherein the correction value calculating unit reads out a moving average value of a plurality of previously obtained second correction values and updates second correction value information with a moving average value reflecting the calculated second correction value; and a vehicle velocity correcting unit configured to correct the detection vehicle velocity, wherein the vehicle velocity correcting unit performs a second correcting process of correcting the detection vehicle velocity using the second correction value after performing a first correcting process of correcting the detection vehicle velocity using the first correction value.

2. The radar device according to claim 1, wherein:

after performing the second correcting process, the vehicle velocity correcting unit compares the first correction value and the second correction value, and transitions from the second correcting process to the first correcting process according to the comparison result.

3. The radar device according to claim 2, wherein:

after performing the second correcting process, the vehicle velocity correcting unit calculates the difference between the first correction value and the second correction value, and transitions from the second correcting process to the first correcting process if the calculated difference is equal to or larger than a predetermined value.

4. The radar device according to claim 1, wherein:

if the number of frequencies corresponding to peaks of the reception levels of the reflected waves and included in a predetermined frequency range including a frequency corresponding to the detection vehicle velocity in the CW mode is one, the relative velocity calculating unit calculates the relative velocity of the still object.

5. The radar device according to claim 1, wherein:

in the FM-CW mode, the relative velocity calculating unit selects a target having a relative velocity in a predetermined velocity range including the detection vehicle velocity, from the targets, and calculates the relative velocity of the selected target as the relative velocity of the still object.

6. A vehicle velocity correction method which is performed in a computer, comprising:

a detection vehicle velocity acquiring process of acquiring a detection vehicle velocity detected on the basis of rotation of a wheel;

a relative velocity calculating process of calculating the relative velocity of a still object on the basis of the frequencies of the reflected waves of a transmission wave from targets in each of an FM-CW mode for transmitting a transmission wave to targets, which is applied frequency modulation and a CW mode for transmitting a transmission wave to targets, which is not applied the frequency modulation;

a correction value calculating process of calculating a first correction value on the basis of the detection vehicle velocity and the relative velocity of the still object obtained in the CW mode and calculating a second correction value on the basis of the detection vehicle velocity and the relative velocity of the still object obtained in the FM-CW modes wherein the calculated second correction value is obtained by dividing the relative velocity of the still object calculated in the FM-CW mode by the detection vehicle velocity, and wherein the correction value calculating unit reads out a moving average value of a plurality of previously obtained second correction values and updates second correction value information with a moving average value reflecting the calculated second correction value; and a vehicle velocity correcting process of correcting the detection vehicle velocity, wherein the vehicle velocity correcting process includes a second correcting process of correcting the detection vehicle velocity using the second correction value after a first correcting process of correcting the detection vehicle velocity using the first correction value.

\* \* \* \* \*